(12) United States Patent
Robinson et al.

(10) Patent No.: US 9,059,884 B2
(45) Date of Patent: Jun. 16, 2015

(54) ROUTING OF IP TRAFFIC DIRECTED AT DOMAIN NAMES USING DNS REDIRECTION

(75) Inventors: Gary Robinson, Magherafelt (GB); Kieran Sullivan, Ballymena (GB)

(73) Assignee: Openwave Mobility, Inc., Redwood, CA (US)

(*) Notice: Subject to any disclaimer, the term of this patent is extended or adjusted under 35 U.S.C. 154(b) by 408 days.

(21) Appl. No.: 13/010,757

(22) Filed: Jan. 20, 2011

(65) Prior Publication Data

US 2012/0191874 A1    Jul. 26, 2012

(51) Int. Cl.
*G06F 15/16* (2006.01)
*H04L 29/12* (2006.01)

(52) U.S. Cl.
CPC .... *H04L 29/12066* (2013.01); *H04L 29/12132* (2013.01); *H04L 29/12698* (2013.01); *H04L 29/12811* (2013.01); *H04L 61/1511* (2013.01); *H04L 61/1552* (2013.01); *H04L 61/3055* (2013.01); *H04L 61/6009* (2013.01)

(58) Field of Classification Search
None
See application file for complete search history.

(56) References Cited

U.S. PATENT DOCUMENTS

| | | | |
|---|---|---|---|
| 2002/0004796 A1* | 1/2002 | Vange et al. | 707/10 |
| 2004/0215823 A1* | 10/2004 | Kleinfelter et al. | 709/245 |
| 2005/0044270 A1* | 2/2005 | Grove et al. | 709/238 |
| 2008/0140847 A1 | 6/2008 | Almog | |
| 2009/0196218 A1 | 8/2009 | Pulini et al. | |
| 2009/0210526 A1* | 8/2009 | Howell et al. | 709/224 |
| 2009/0216903 A1* | 8/2009 | Howell et al. | 709/245 |
| 2010/0034089 A1 | 2/2010 | Kovvali et al. | |
| 2010/0034218 A1 | 2/2010 | Kovvali et al. | |

OTHER PUBLICATIONS

"Domain Name System"; Wikipedia, der freien Enzyklopadie; Jan. 18, 2011; (XP55038936) v1; p. 1-14.
International Search Report, PCT/US2012/050904, Jan. 10, 2012.

* cited by examiner

*Primary Examiner* — Jeffery Williams
*Assistant Examiner* — Christopher C Harris (57) ABSTRACT

A domain name system (DNS) server is disclosed. The DNS server includes: a receiver to receive a DNS query comprising a domain name from a client device, wherein the domain name corresponds to a host server; a modifier to append a domain to an end of the domain name to create a modified domain name; and a mapping engine to compare the modified domain name to a local cache, wherein the local cache comprises a list of domain names, at least some of which are to be routed to an Internet Protocol (IP) address corresponding to an intermediate server.

12 Claims, 8 Drawing Sheets

ROUTING OF IP TRAFFIC DIRECTED AT DOMAIN NAMES USING DNS REDIRECTION

BACKGROUND

Network operators frequently desire to redirect Internet Protocol (IP) traffic passing through its network. Some network operators may desire to be able to route traffic, especially (but not limited to) Hypertext Transfer Protocol (HTTP) traffic, through an intermediate server based on the domain name for which the IP traffic is destined. However, problems arise because the domain name layer is contained at the application layer and network load balancers and routers do not have access to the domain name as they investigate data packets at the IP layer. For a service (like a load balancer or router) to obtain the domain name, the service would likely have to perform some packet inspection, which is a costly operation in terms of network performance.

One potential solution for this problem may be to use a domain name system (DNS) server in the network to redirect the traffic. However, conventional DNS redirecting methods encounter problems when trying to redirect domain names for which the DNS is authoritative but that are not recognized by the DNS server. One such problem occurs when the DNS server blocks domain names for which the DNS server should be authoritative, but is not. This can be prevented by adding all resource records for a particular domain name to the DNS server, but this solution is impracticable and can be time consuming.

SUMMARY

Embodiments of a system are described. In one embodiment, the system is a domain name system (DNS) server. The DNS server includes: a receiver to receive a DNS query comprising a domain name from a client device, wherein the domain name corresponds to a host server; a modifier to append a domain to an end of the domain name to create a modified domain name; and a mapping engine to compare the modified domain name to a local cache, wherein the local cache comprises a list of domain names, at least some of which are to be routed to an Internet Protocol (IP) address corresponding to an intermediate server. Other embodiments of the system are also described.

Embodiments of a computer program product and a method are also described. Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments present a method and system for routing Internet Protocol (IP) traffic through an intermediate server using domain name system (DNS) redirection. More specifically, a DNS server is configured to append a domain to the end of a received domain name and to search for the modified domain name in a local cache to determine whether the domain name should be routed through an intermediate server.

Conventional methods of DNS redirection are able to redirect a request from a client server for a certain domain name to an intermediate server. However, the DNS also encounter problems using conventional methods of redirection when the DNS server should be authoritative for a certain domain name, but is not authoritative.

Normally, a DNS server allows an administrator to configure the IP addresses of domain names and hosts for which the server is authoritative. This means that the DNS server contains the final word as to the IP address of the servers within a certain zone that the DNS server has loaded from its configuration files. For example, if the DNS server is authoritative for "example1.com," then it will contain the IP addresses (or point to the corresponding name servers) for any host whose domain ends in "example1.com." Under one conventional embodiment, the DNS server is designed to store hosts and domains under the relevant zone domain. Under one embodiment, a Berkeley Internet Name Domain (BIND) DNS server implements the above example by having one zone file for all of the hosts under the zone domain "example1.com."

Any server name under "example1.com" will be searched for in the corresponding zone file. Any DNS lookup for a host under "example1.com" that is not in this zone file will result in a negative response (i.e. if the authoritative DNS server does not know the IP address for the host, it returns a response stating that it cannot find the IP address for the requested host). Thus, if a DNS server is inserted in the network, and a zone file for "example1.com" is added, the DNS server would end up blocking access to all *.example1.com domain names that were not included in the zone file. This would have the side effect of blocking any access to resource records "images.example1.com," or "news.example1.com," etc., as the local zone file, which is pretending to be authoritative for this domain, does not have these hosts. Likewise, the DNS server would block any other resource records that are not specifically included for a particular domain zone file.

Conventional methods of overcoming this problem are often expensive or cause other problems. For example, routing all traffic through a proxy server by providing proxy configuration on each client device may overcome the problem stated above, but this requires the ability to include the proxy server settings on every client device and cannot be accomplished at the DNS server alone. Another conventional method includes inserting a load balancer (e.g. an application control engine module) or implementing router settings into the network that will route all traffic through a proxy. However, this solution does not provide the ability to select which traffic should be routed (based on the traffic profile) except by creating a rule based on the source/destination IP address and/or port.

Because of the drawbacks of the conventional systems and methods, the embodiments described herein provides several advantages by providing a modified DNS server that is able to route IP addresses by appending a domain to the end of a domain name for searching the DNS server cache, which allows the modified DNS server to retrieve the IP address from a forwarder DNS server if the domain name is not found in the DNS server cache. The modified DNS server may be able to conserve time by not performing packet inspection and by routing solely based on the domain name. The system described herein may be implemented without any modifications to client devices, origin servers, or intermediate servers.

Figure 1:
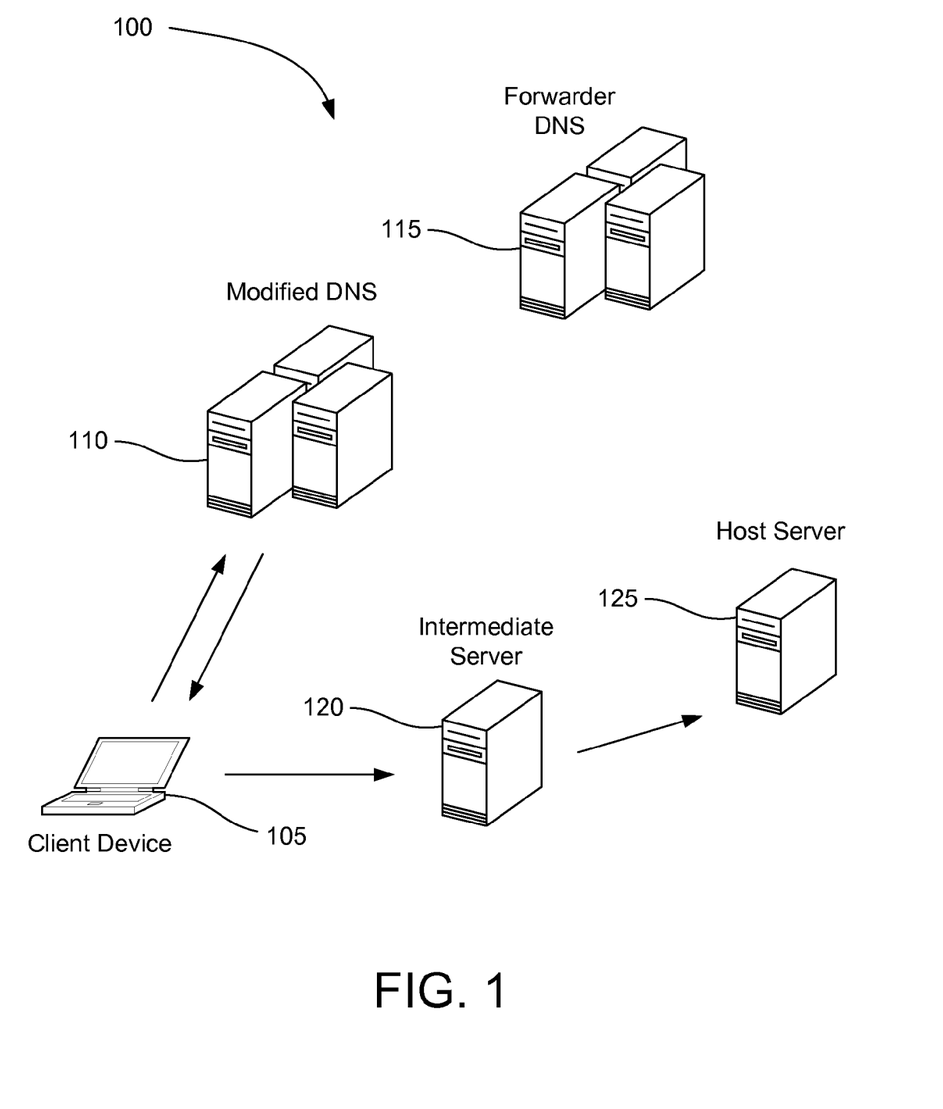
FIG. 1 depicts a schematic diagram of one embodiment of an Internet Protocol (IP) routing system.

FIG. 1 depicts a schematic diagram of one embodiment of an Internet Protocol (IP) routing system 100. The routing system 100 includes a client device 105 in communication with a modified DNS server 110 according to principles described herein. The routing system 100 in the present embodiment further includes a forwarder DNS server 115, an intermediate server 120, and a host server 125. In some embodiments, the host server 125, forwarder DNS server 115, and intermediate server 120 are all part of a single network. In other embodiments, one or all of the forwarder DNS server 115, intermediate server 120, and host server 125 are not part of a single network connected via an Ethernet connection, but are connected to the client device 105 or other components of the network with which the client device 105 is communicating through an Internet connection. Although the routing system 100 of FIG. 1 is shown with certain components and functionality, other embodiments of the routing system 100 may include fewer or more components to implement less or more functionality.

The client device 105 may be any device connected to any network through any type of connection. In general, the client device 105 operates to access data (e.g. a website) on the host server 125. In order to facilitate this type of access, the client device 105 interfaces with the modified DNS server 110 to retrieve a destination IP address (e.g. 193.4.21.5) for the host server 125 based on the host server's domain name (e.g. www.example1.com). In one embodiment, if the DNS server 110 does not have a mapping to correlate the destination IP address with the domain name of the host server 125—i.e., the DNS server 110 is not authoritative for that domain name—the modified DNS server 110 communicates with the forwarder DNS server 115 to obtain the corresponding DNS mapping. In another embodiment, the modified DNS server 110 is part of a cluster of modified DNS servers, such that when one modified DNS server 100 determines that it does not have the forward mapping for the domain name, it communicates with other DNS servers 110 in the cluster to determine if any of the other modified DNS servers 110 contain a mapping for the domain name before attempting to communicate with the forwarder DNS server 115.

As described in further detail herein, the modified DNS server 110 may be configured to redirect communication requests for one or more specified domain names (e.g. "example1.com") to an intermediate server 120. In one embodiment, the modified DNS server 110 includes a zone file for a domain name to be redirected to the intermediate server 120 at IP address "10.20.30.40." For example, the modified DNS server 110 may have a zone file for "example1.com." This zone file would attempt to make the modified DNS server 110 authoritative for all DNS queries for "example1.com" and its resource records. Consequently, a DNS query for "www.example1.com" would be directed to the modified DNS server 110 containing the zone file for "example1.com." The modified DNS server 110 then searches the zone file for the corresponding domain name match in the zone file. Because the modified DNS server 110 is configured to redirect "www.example1.com," the modified DNS server 110 will find the IP address for the intermediate server 120 ("10.20.30.40") in the zone file and return that IP address to the client device 105.

Figure 2:
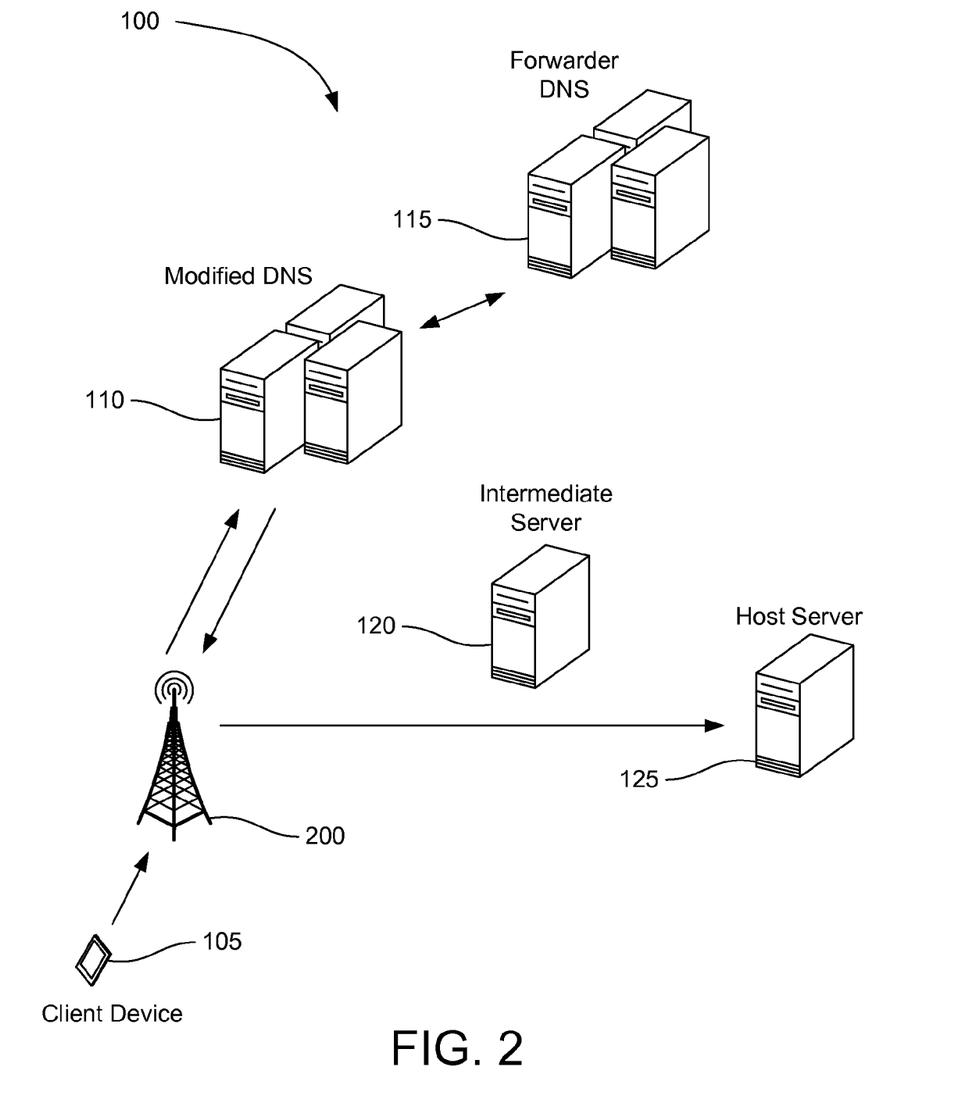
FIG. 2 depicts a schematic diagram of one embodiment of an Internet Protocol (IP) routing system.

FIG. 2 depicts a schematic diagram of one embodiment of the Internet Protocol (IP) routing system 100. The routing system 100 includes a client device 105 in communication with a signal tower 200. FIG. 2 depicts a system 100 where the DNS query from the client device 105 is for a domain name for which a modified DNS server 110 is not authoritative—the modified DNS server 110 does not have a zone file corresponding to the domain name in the request.

The client device 105 sends a DNS query for a specific domain name to the signal tower 200. The signal tower 200 forwards the request to a modified DNS server 110. In the present embodiment, the modified DNS server 110 is not authoritative for the domain name in the DNS query, so the modified DNS server 110 sends the request to a forwarder DNS server 115. For example, if the DNS query is for "www.example1.com," and the modified DNS server 110 (or cluster of DNS servers) does not contain a zone file for "example1.com," the modified DNS server 110 is not authoritative for the domain and communicates the request onto the forwarder DNS server 115. The forwarder DNS server 115 may be part of the same network or it may be contacted by the modified DNS server 110 over an Internet connection. The forwarder DNS server 115 obtains the IP address for the host server 125 according to the domain name in the DNS query and returns the host IP address to the modified DNS server 110. The modified DNS server 110 then relays the IP address for the host server to the signal tower 200, which then connects the client device 105 directly to the host server 125 instead of connecting to an intermediate server 120.

In one embodiment, the DNS query contains a domain name for which the modified DNS server 110 is authoritative, but also contains a resource record for which the DNS server 110 is not authoritative. While conventional DNS servers in such an embodiment would be unable to correctly handle the request, and would therefore return an error to the client device 105 rather than finding the host server's true IP address, the modified DNS server 110 is able to forward the request onto the forwarder DNS server 115 and obtain the true IP address.

Figure 3:
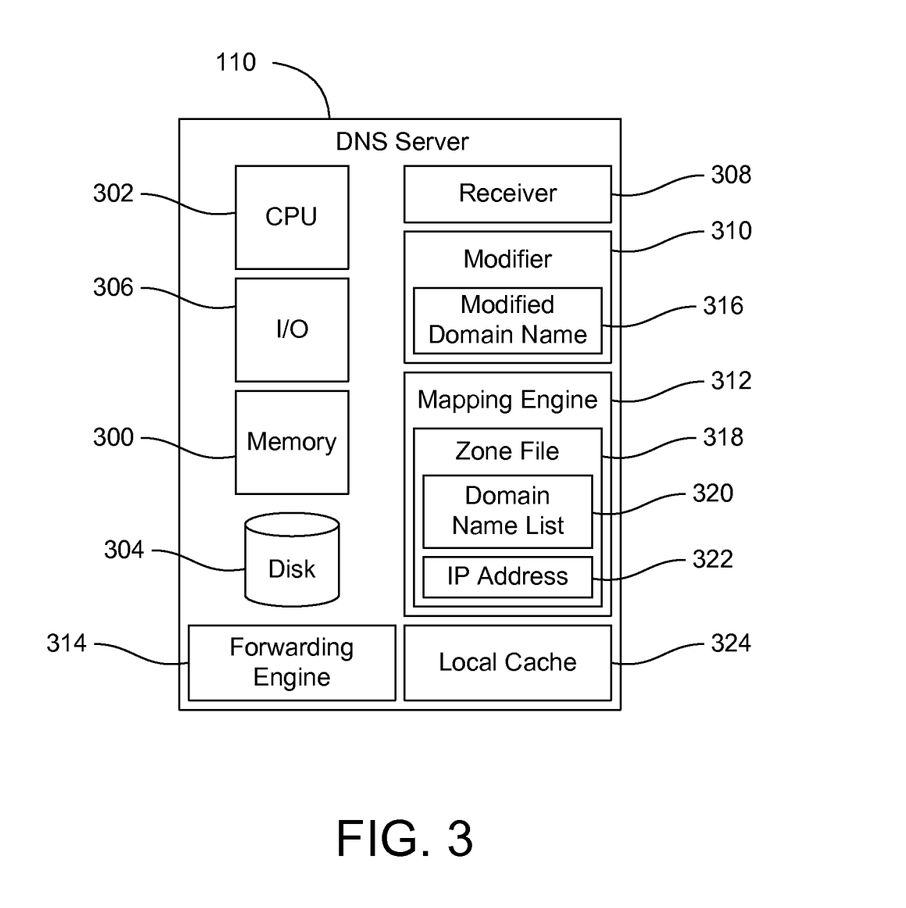
FIG. 3 depicts a schematic diagram of one embodiment of the modified domain name system (DNS) server of FIG. 2.
Figure 8:
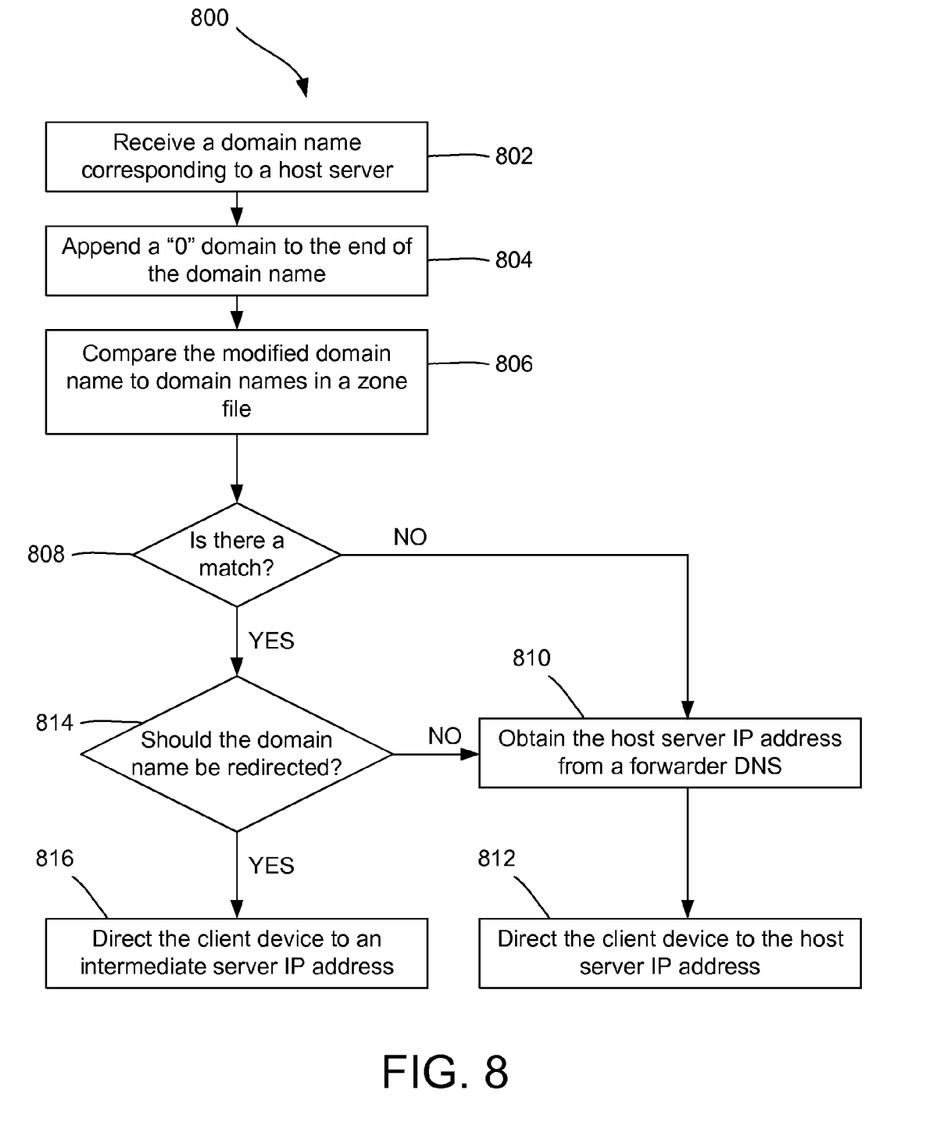
FIG. 8 depicts a flow chart diagram of one embodiment of a method for routing Internet traffic.

FIG. 3 depicts a schematic diagram of one embodiment of the modified DNS server 110 of FIG. 2. The depicted modified DNS server 110 includes various components, described in more detail below, that are capable of performing the functions and operations described herein. In one embodiment, at least some of the components of the modified DNS server 110 are implemented in a computer system. For example, the functionality of one or more components of the modified DNS server 110 may be implemented by computer program instructions stored on a computer memory device 300 and executed by a processing device 302 such as a central processing unit (CPU). The modified DNS server 110 may include other components, such as a disk storage drive 304, input/output devices 306, a receiver 308, a modifier 310, a mapping engine 312, a forwarding engine 314, or others. The modified DNS server 110 may be part of a larger cluster of modified DNS servers, or part of a larger network or system in some embodiments. In some embodiments, the modified DNS server 110 may be used to implement the method described herein as depicted in FIG. 8.

The illustrated modified DNS server includes a receiver 308, a modifier 310, a mapping engine 312, and a forwarding engine 314. The receiver 308 is configured to receive a domain name from a client device 105. The domain name may be contained within a DNS query in which the client device 105 is attempting to connect with a remote host server 125. The domain name in the DNS query corresponds to the host server 125. In some embodiments, the DNS query is relayed to the modified DNS server 110 through a signal tower 200 or other intermediate communication device.

The modifier 310 is configured to append a domain that has at least one character to an end of the domain name to create a modified domain name 316. In one embodiment, the modifier 310 appends a "0" domain to the end of the domain name. For example, if the domain name received by the receiver 308 is "www.example1.com." then the modifier 310 appends a "0" domain to the end of the domain name, such that the modified domain name 316 is "www.example1.com.0." While a "0" domain is used as an example, the modifier 310 may append any domain or combination of more than one domain that is compatible with the system described herein.

The appended domain in the modified domain name 316 corresponds to a dummy zone in the modified DNS server 110. In the above example, the dummy zone (also referred to herein as the "zero zone") exists as a result of a code change in the modified DNS server 110. The zero zone may be used because it does not exist as a valid root level zone on the Internet, and so will not clash with any valid domain names. Using the zero zone, the modified DNS server 110 may be able to add all domain names to be handled (whether redirected or otherwise) by the modified DNS server 110 to a single zone file 318. The zone file 318 may be stored in a local cache 324 of the DNS server 110. While the zero zone is used herein, other zones may be used that do not clash with valid domain names in a network or on the Internet, such that the domain appended to the domain name may be different than illustrated herein.

When a DNS query is received from the client device 105 by the receiver 308, the modified DNS server 110 appends a "0" domain to any domain names in the request and then performs a lookup in the zero zone file 318 to determine if the modified DNS server 110 should redirect any of the domain names should be routed through an intermediate server 120. The mapping engine 312 performs a lookup in the zero zone file 318 and compares the modified domain name 316 to a mapping in the zero zone file 318. The mapping includes a list 320 of domain names that the modified DNS server 110 is already configured to handle and the corresponding IP addresses 322 for those domain names. If the mapping engine 312 finds a match to the modified domain name 316, the modified DNS server 110 returns the corresponding IP address 322 to the client device 105. If the returned IP address 322 points to an intermediate server 120, the client device 105 connects to the intermediate server 120. In some embodiments, all of the domain names for which the modified DNS server 110 is authoritative are redirected to one or more intermediate servers 120. In other embodiments, only specified domain names may be redirected to an intermediate server 120 while others may be connected directly to the host server 125.

If the zone file 318 does not contain an exact match for the modified domain name 316 (including any resource records), the modified DNS server 110 is not authoritative for that domain name. The forwarding engine 314 removes the appended domain from the modified domain name 316 and forwards the domain name to the appropriate forwarder DNS server 115. For example, if the modified domain name "images.example1.com.0." 316 was not found in the zero zone file 318, the forwarding engine 314 removes the "0" domain from the modified domain name 316 and forwards "images.example1.com." to the forwarder DNS server 115 to obtain the IP address 322 for the host server 125.

In one embodiment, after the forwarder DNS server 115 returns the true IP address 322 for the host server 125 to the modified DNS server 110, the true IP address 322 is then be written to the zero zone file 318. The true IP address 322 may be written to the zero zone file 318 through a separate process independent of the DNS server 115 and loaded into the DNS server 115 thereafter. Future DNS queries for the specified domain name may then be handled by the DNS server 115 without contacting the forwarder DNS server 115. This may allow a customer to control the separate process to customize the zero zone file 318. In an alternative embodiment, the DNS server 115 itself may be configured to write the true IP address 322 to the zero zone file 318.

Figure 4:
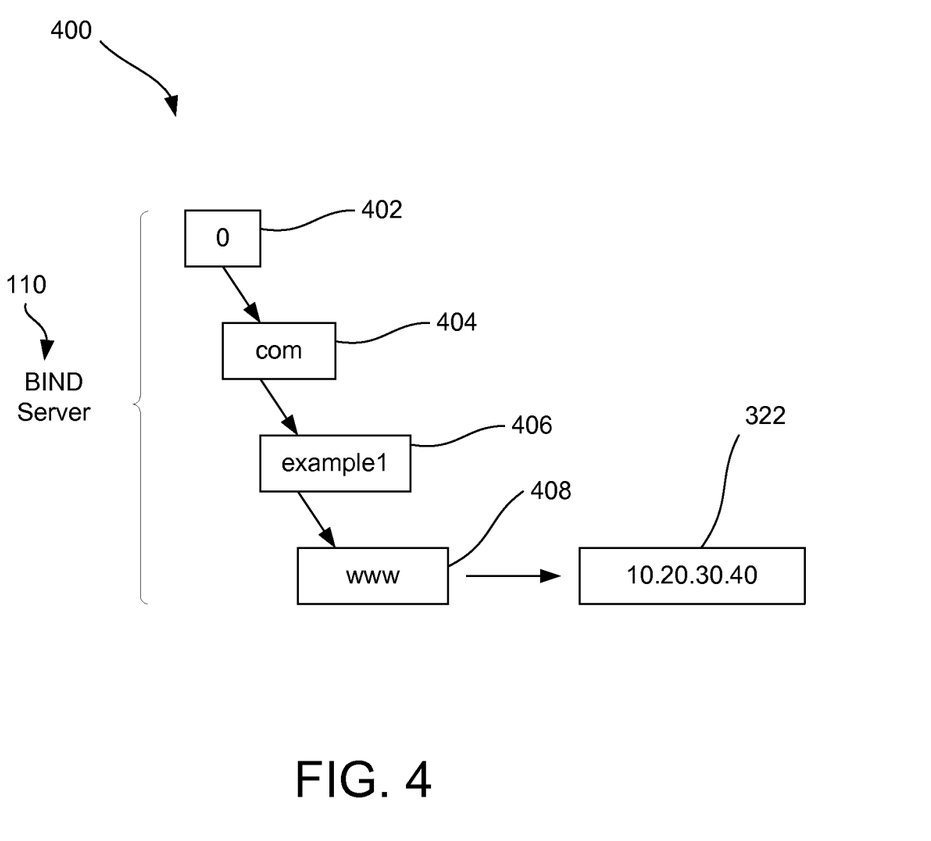
FIG. 4 depicts a flow chart diagram of one embodiment of a method for finding a domain name match in a zone file.

FIG. 4 depicts a flow chart diagram of one embodiment of a method 400 for finding a domain name match in a zone file 318. In one embodiment, the modified DNS server 110 is a BIND server. The BIND server 110 receives a domain name from the client device 105 and appends a "0" domain to the end of the domain name. The BIND server 110 then searches the zero zone (in memory), which corresponds to the appended domain. The BIND server 110 starts at the end of the domain name and works backward, such that the BIND server 110 attempts to match "www.example1.com.0." to the zone file 318 starting at the end of the modified domain name 316. Because the BIND server 110 uses the zero zone file 318, the modified domain name 316 matches at the "0." term 402 and the BIND server will act as the authoritative DNS server for the modified domain name 316 shown in FIG. 4.

The BIND server 110 continues searching the zone file 318 at each successive level until it either reaches the corresponding resource record or does not find a match. Consequently, after determining that a particular BIND server 110 is authoritative for the zero zone, the BIND server 110 will search the next term 404 in the modified domain name 316, "com." If the BIND server 110 finds a match, the BIND server 110 then compares the main domain term 406 in the modified domain name 316, "example1." If the zone file 318 contains the domain 406 "example1" then the BIND server 110 will compare the resource record 408 "www" of the modified domain name 316 with the zone file 318. Upon finding a complete match for the modified domain name 316, the BIND server 110 retrieves the corresponding IP address 322 and returns it to the client device 105. In the present embodiment, the stored IP address 322 for "www.example1.com.0." is "10.20.30.40" corresponding to an intermediate server 120. In other embodiments, the stored IP address 322 may correspond to the host server 125 for the domain name.

Figure 5:
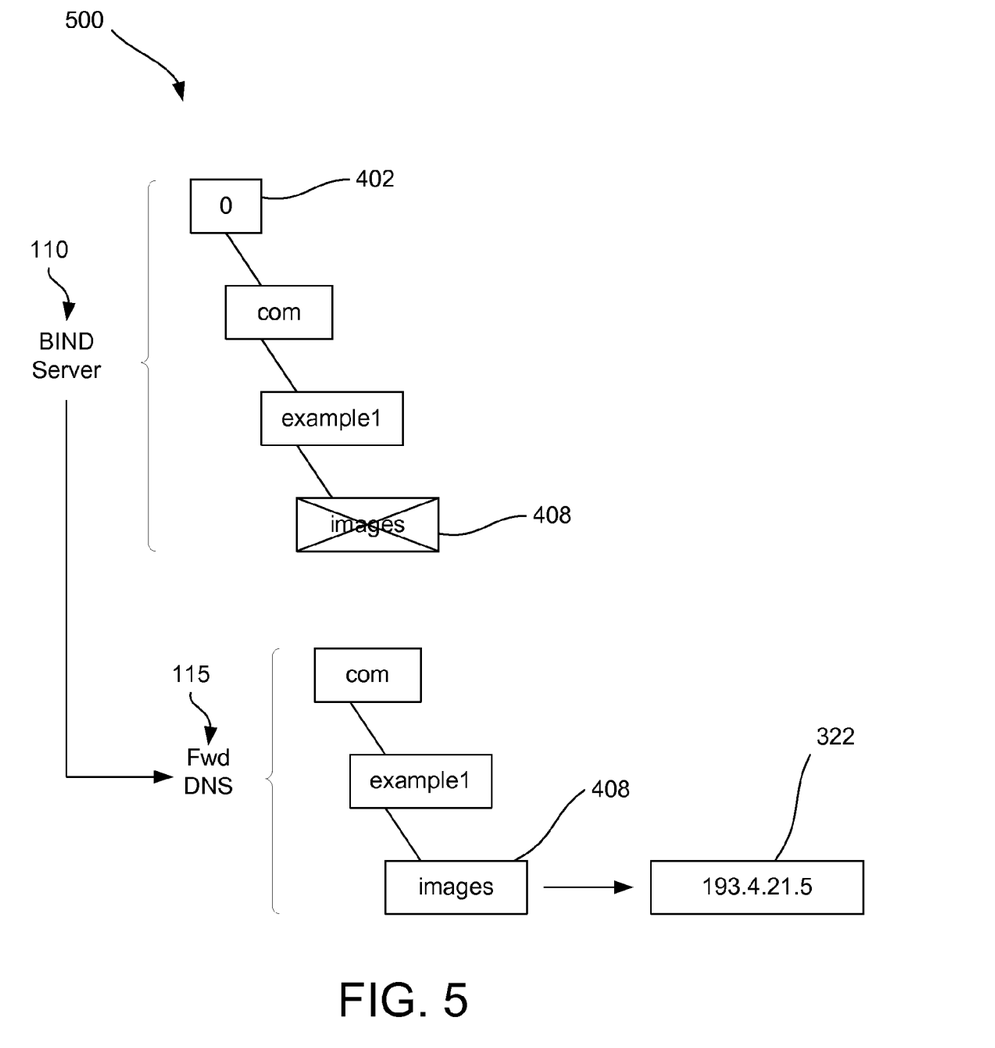
FIG. 5 depicts a flow chart diagram of one embodiment of a method for finding a domain name match in a zone file and a forwarder DNS server.

FIG. 5 depicts a flow chart diagram of one embodiment of a method 500 for finding a domain name match in a zone file 318 and a forwarder DNS server 115. In the example illustrated in FIG. 5, the BIND server 110 receives a DNS query for the domain name "images.example1.com." and appends a "0" domain to the end of the domain name. After searching the zero zone file 318 for the modified domain name "images.example1.com.0." and if the BIND server 110 determines that there is not a match for the resource record 408 "images" of the modified domain name 316, the BIND server 110 determines that it is not authoritative for the domain name. Because the BIND server 110 appends "0" 402 to the domain name to compare to the zone file 318, the BIND server 110 is able to correctly forward the request to appropriately handle the request, rather than return an error message. The BIND server 110 removes the appended "0" 402 from the domain name and forwards the DNS query with the original domain name to a forwarder DNS server 115 to obtain the true IP address 322 "193.4.21.5" for the corresponding host server 125.

Figure 6:
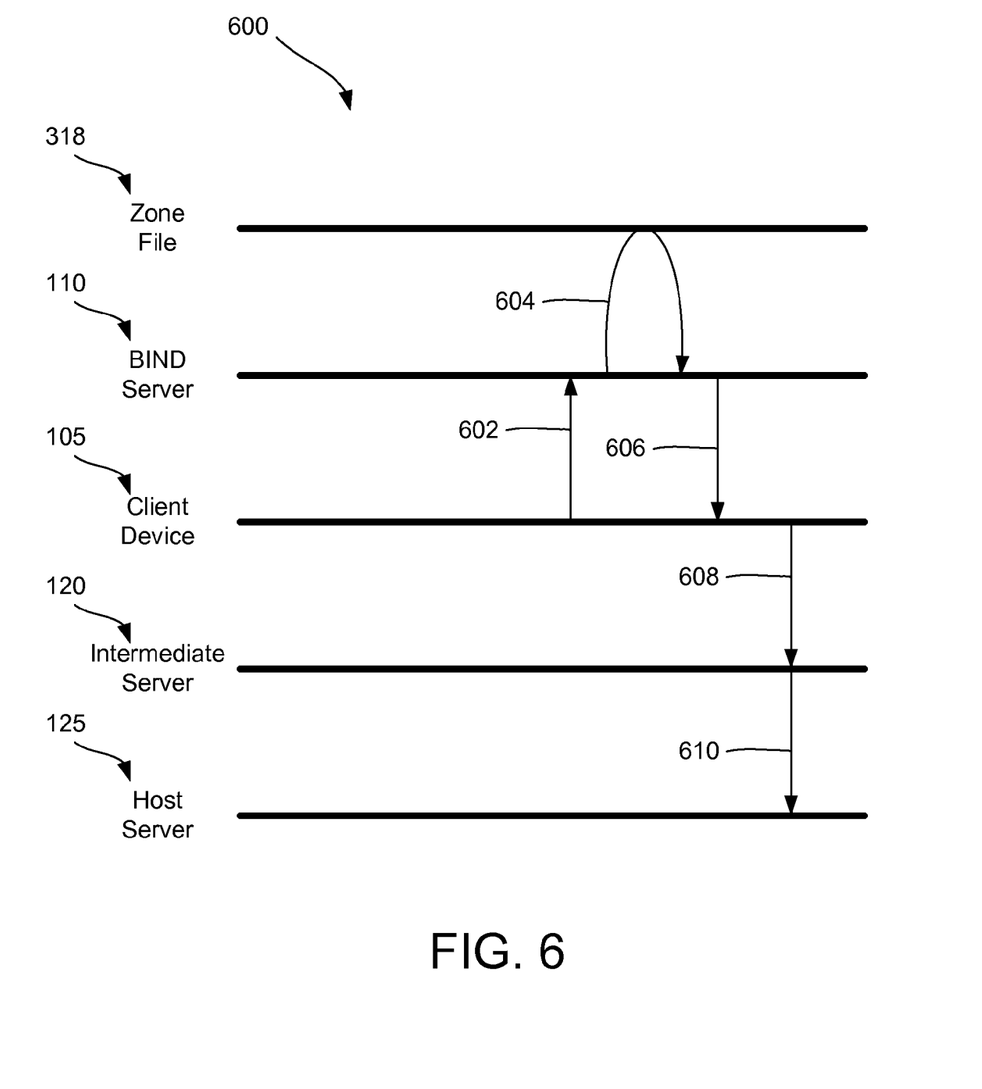
FIG. 6 depicts a flow chart diagram of one embodiment of a method for routing IP traffic through an intermediate server.

FIG. 6 depicts a flow chart diagram of one embodiment of a method 600 for routing IP traffic through an intermediate server 120. The client device 105 sends 602 a DNS query to the BIND server 110. The BIND server 110 appends 604 a "0" domain and searches the zero zone file 318 for a match to the modified domain name 316. Upon finding a match, the BIND server 110 retrieves the corresponding IP address 322 for the intermediate server 120 from the database and returns 606 the IP address 322 to the client device 105. The client device 105 is then directed 608 to the intermediate server 120 before being connected 610 to the host server 125. The intermediate server 120 may act as a proxy service between the client device 105 and the host server 125.

Figure 7:
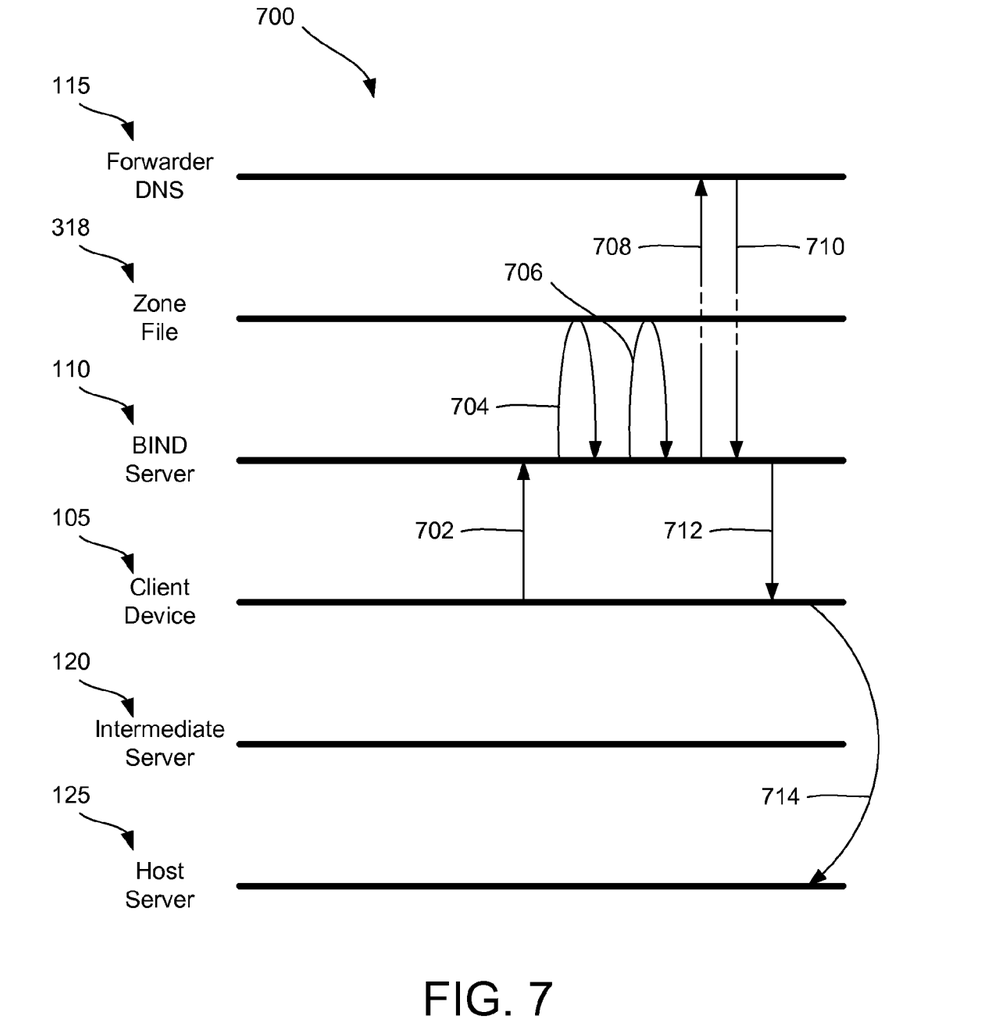
FIG. 7 depicts a flow chart diagram of one embodiment of a method for directing IP traffic to a host server.

FIG. 7 depicts a flow chart diagram of one embodiment of a method 700 for directing IP traffic to a host server 125. The client device 105 sends 702 a DNS query to the BIND server 110. The BIND server 110 appends 704 a "0" domain and searches the zero zone file 318 for a match to the modified domain name 316. Upon determining that the modified domain name 316 does not exactly match to any domain name stored in the zero zone file 318, the BIND server 110 removes 706 the appended "0." from the modified domain name and may initiate a second search for the domain name to determine if the BIND server 110 is authoritative for the domain name. Upon failing to find a match, the BIND server 110 forwards 708 the request to a forwarder DNS server 115. The forward DNS server 115 obtains the IP address 322 for the corresponding host server and returns 710 the IP address to the BIND server. The BIND server 110 may store the IP address 322 in its cache 324 so that the BIND server 110 is able to handle future requests for the specific domain name. The BIND server 110 returns 712 the host IP address 322 to the client device 105, and the client device 105 bypasses the intermediate server 125 to connect 714 directly to the host server 125.

In some embodiments, all of the domain names stored in the zero zone file 318 are directed to an intermediate server 120. In another embodiment, some of the domain names stored in the zero zone file 318 correspond to actual host IP addresses 322 such that the domain names are directed to bypass the intermediate server 120. In other embodiments, the BIND server 110 may have zone files separate from the zero zone file 318 that store the IP addresses 322 for domain names to bypass the intermediate server 120. In such embodiments, when the BIND server 110 fails to find a match for a particular domain name and retrieves the host IP address 322 from the forwarder DNS server 115, the BIND server 110 may store the host IP address 322 in a zone file separate from the zero zone file 318.

FIG. 8 depicts a flow chart diagram of one embodiment of a method 800 for routing Internet traffic. Although the method 800 is described in conjunction with the IP routing system 100 of FIG. 1, embodiments of the method 800 may be implemented with other types of IP routing systems.

A modified DNS server 110 receives 802 a domain name corresponding to a host server 125 from a client device 105. The modified DNS server 110 appends 804 a domain to the end of the domain name to create a modified domain name 316. After appending 804 the domain, the modified DNS server 110 compares 806 the modified domain name 316 to domain names stored in a zone file 318 corresponding to the appended domain. The zone file 318 also includes IP addresses 322 for each stored domain name. The stored IP addresses 322 may correspond to an intermediate server 120 or to the host server 125.

The modified DNS server 110 determines 808 whether the modified domain name 316 matches any domain name stored in the zone file 318. If the modified domain name 110 does not find an exact match for the domain name, the DNS server 110 forwards the request to a forwarder DNS server 115 and obtains 810 the host IP address 322. The DNS server 110 then directs 812 the client device 105 to the host IP address 322.

In some embodiments, the zone file 318 stores domain names that are not to be routed through the intermediate server 120, but are to be connected directly to the host server 125. In such embodiments, after finding an exact match, the DNS server 110 determines 814 whether the domain name is to be redirected to the intermediate server 120. The IP address 322 stored with the domain name in the zone file 318 may determine whether the domain name is redirected. If the IP address 322 corresponds to the intermediate server 120, the client device 105 is directed 816 to the intermediate server. If the IP address 322 corresponds to the host server 125, the client device 105 is directed 812 to the host server 125. The DNS server 110 may contact the forwarder DNS server 115 to obtain the host IP address 322.

Pseudo-code for the method described herein is shown:

```
For each lookup
    Add "0" domain to the end of the domain name being looked up
    Search the modified DNS server database (which will search the
    db.zero zone file)
    If successful result
        return that IP address
    else
        remove the "0" domain and repeat the search (will query the
        forwarder DNS server as normal)
    end if
end for
```

In one embodiment, the domain names to be redirected are determined automatically by the modified DNS server 110 based on statistics relating to traffic or other data. In another embodiment, redirected domain names are determined manually by a network administrator.

In one embodiment, the DNS server 110 removes the domain from the end of the domain name in response to not finding an exact match to the modified domain name 316 in the local cache 324, and obtains a destination IP address 322 for the host server 125 from a forwarding DNS server 115. In one embodiment, the DNS server 110 stores the domain name and corresponding destination IP address 322 for the domain name in the local cache 324 after obtaining the destination IP address 322 for the domain name from the forwarder DNS server 115.

In some embodiments, the DNS server 110 may remove the appended domain after finding a match and before returning the corresponding IP address 322 to the client device. This may help avoid errors caused by returning a different domain name than the domain name sent with the DNS query. DNS servers 110 also commonly report the zone domain in which the domain name was found, as well as the associated name servers for that zone. In embodiments implementing the zero zone, a DNS server 110 would typically attempt to respond with an authority section in the response that contains a name server under the "0" zone. While this does not cause problems for client devices 105, it may release implementation specific information to the client device 105, which may be a security risk. Consequently, solutions may be to remove the authority section from the response or to modify the DNS server 110 to report the correct name server mapping for the queried domain.

While the embodiments described herein show the use of a zone file 318 for redirecting IP traffic, other embodiments may modify the DNS server 110 code to contain a separate internal list of the domain names to be redirected, or the domain names may be directly inserted into the cache 324 in a way that they would not expire.

An embodiment of an IP routing system 100 includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, including an operation to route IP traffic through an intermediate server.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. A computer readable storage medium is a specific type of computer-readable or -usable medium. Examples of a computer-readable medium include a semiconductor or solid state memory, magnetic tape, a removable computer diskette, a random access memory (RAM), a read-only memory (ROM), a rigid magnetic disk, and an optical disk. Hardware implementations including computer readable storage media also may or may not include transitory media. Current examples of optical disks include a compact disk with read only memory (CD-ROM), a compact disk with read/write (CD-R/W), and a digital video disk (DVD).

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A domain name system (DNS) server, comprising:
   at least one hardware processor;
   a receiver to receive a DNS query comprising a domain name from a client device, wherein the domain name corresponds to a host server;
   a memory comprising computer readable instructions, executable by the at least one hardware processor in the DNS server, the computer readable instructions comprising:
   a modifier to append an appended domain to an end of the domain name of the DNS query to create a modified domain name;
   a mapping engine to search for a matching domain name to the modified domain name in a zone file corresponding to the appended domain, wherein the zone file is stored in a local cache on a memory device, wherein the zone file comprises a list of domain names, at least some of which are to be routed to an Internet Protocol (IP) address corresponding to an intermediate server, wherein the at least one hardware processor and memory are configured to return the IP address of the intermediate server to the client device in response to the mapping engine finding in the zone file a matching domain name, to the modified domain name, that is to be routed to the IP address corresponding to the intermediate server; and
   a forwarding engine to remove the appended domain from the modified domain name in response to the mapping engine not finding a match for the modified domain name and forwarding the domain name to a forwarding server if the DNS server is not authoritative for the domain name to obtain a destination IP address for the host server for sending to the client device.

2. The DNS server of claim 1, wherein the mapping engine is further configured to store the domain name and the destination IP address in the local cache after obtaining the destination IP address for the domain name from the forwarding DNS server.

3. The DNS server of claim 1, wherein the mapping engine is further configured to remove the domain from the modified domain name for a response to the client device, wherein the response corresponds to a successful search for the modified domain name in the list of domain names.

4. The DNS server of claim 1, wherein the DNS server is configured to perform a second search after removing the appended domain from the modified domain name to determine if the DNS server is authoritative for the domain name.

5. A method for routing Internet traffic, the method comprising:
   at a domain name system (DNS) server;
   receiving a DNS query comprising a domain name from a client device, wherein the domain name corresponds to a host server;
   appending an appended domain at an end of the domain name of the DNS query to create a modified domain name;
   comparing the modified domain name to a list of domain names in a zone file corresponding to the appended domain, wherein the zone file is stored in a local cache and at least some of the domain names in the list are to be routed to an Internet Protocol (IP) address corresponding to an intermediate server;
   returning the IP address of the intermediate server to the client device in response to finding a match for the modified domain name when the match corresponds to a domain name in the list to be routed to the intermediate server;
   removing the appended domain name from the modified domain name in response to not finding a match for the modified domain name in the list; and
   forwarding the domain name to a forwarding DNS server, after the appended domain has been removed from the modified domain name, if the DNS server is not authoritative for the domain name, to obtain a destination IP address for the host server.

6. The method of claim 5, further comprising storing the domain name and destination IP address for the domain name in the local cache after obtaining the destination IP address for the domain name from the forwarding DNS server.

7. The method of claim 5, further comprising removing the domain from the modified domain name for a response to the client device, wherein the response corresponds to a successful search for the modified domain name in the list of domain names.

8. The method of claim 5 further comprising performing a second search after removing the appended domain from the modified domain name to determine if the DNS server is authoritative for the domain name.

9. A computer program product, comprising:
   a non-transitory computer readable storage medium to store a computer readable program, wherein the computer readable program, when executed by a processor within a computer, causes the computer to perform operations for routing Internet Protocol (IP) traffic through an intermediate server, the operations comprising:
   at a domain name system (DNS) server;
   receiving a DNS query comprising a domain name from a client device, wherein the domain name corresponds to a host server;
   appending an appended domain at an end of the domain name of the DNS query to create a modified domain name; and
   comparing the modified domain name to a list of domain names in a zone file corresponding to the appended domain, wherein the zone file is stored in a local cache and at least some of the domain names in the list are to be routed to an Internet Protocol (IP) address corresponding to the intermediate server;
   returning the IP address of the intermediate server to the client device in response to finding a match for the modified domain name when the match corresponds to a domain name in the list to be routed to the intermediate server;
   removing the appended domain name from the modified domain name in response to not finding a match for the modified domain name in the list; and
   forwarding the domain name to a forwarding DNS server, after the appended domain has been removed from the modified domain name if the DNS server is not authoritative for the domain name, to obtain a destination IP address for the host server.

10. The computer program product of claim 9, wherein the computer program product, when executed on the computer, causes the computer to perform additional operations, comprising:
    storing the domain name and destination IP address for the domain name in the local cache after obtaining the destination IP address for the domain name from the forwarding DNS server.

11. The computer program product of claim 9, wherein the computer program product, when executed on the computer, causes the computer to perform additional operations, comprising:

removing the domain from the modified domain name for a response to the client device, wherein the response corresponds to a successful search for the modified domain name in the list of domain names.

12. The computer program product of claim 9 wherein the computer program product, when executed on the computer, causes the computer to perform additional operations, comprising: performing a second search after removing the appended domain from the modified domain name to determine if the DNS server is authoritative for the domain name.

* * * * *